(12) United States Patent
Seibicke et al.

(10) Patent No.: US 9,106,109 B2
(45) Date of Patent: Aug. 11, 2015

(54) GENERATOR

(75) Inventors: Frank Seibicke, Borkheide (DE); Joachim Mucha, Berlin (DE); Jörg Waschek, Falkensee (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 287 days.

(21) Appl. No.: 13/502,948

(22) PCT Filed: Oct. 18, 2010

(86) PCT No.: PCT/EP2010/065607
§ 371 (c)(1),
(2), (4) Date: Apr. 19, 2012

(87) PCT Pub. No.: WO2011/048038
PCT Pub. Date: Apr. 28, 2011

(65) Prior Publication Data
US 2012/0205998 A1 Aug. 16, 2012

(30) Foreign Application Priority Data
Oct. 21, 2009 (DE) .......................... 10 2009 045 902

(51) Int. Cl.
*H02K 9/06* (2006.01)
*H02K 9/04* (2006.01)
(Continued)

(52) U.S. Cl.
CPC *H02K 9/04* (2013.01); *F03D 9/002* (2013.01); *H02K 5/20* (2013.01); *H02K 7/1838* (2013.01); *F05B 2260/20* (2013.01); *H02K 1/20* (2013.01); *Y02E 10/725* (2013.01)

(58) Field of Classification Search
CPC ............ H02K 1/20; H02K 9/06; H02K 9/04; H02K 5/20; H02K 7/1838
USPC ...................................... 310/52–64
See application file for complete search history.

(56) References Cited

U.S. PATENT DOCUMENTS 3,819,965 A * 6/1974 Schoendube ................ 310/58
5,331,238 A * 7/1994 Johnsen ...................... 310/58
(Continued)

FOREIGN PATENT DOCUMENTS

CN 101523702 A 9/2009
DE 196 36 591 A1 3/1998
(Continued)

OTHER PUBLICATIONS

DE 19943444 A1 mahince translation Sep. 28, 2013.*

*Primary Examiner* — Dang Le
*Assistant Examiner* — Leda Pham
(74) *Attorney, Agent, or Firm* — Henry M. Feiereisen LLC.

(57) ABSTRACT

A generator includes a stationary stator and a rotor disposed rotatably about an axis of rotation. The stator has a fan drawing air from the ambient air around the generator, wherein the inlet channel is disposed such that air drawn in by the fan is distributed at the core of the stator by the channel over the length of the core in the direction of the axis of rotation. Cooling channels running in the circumferential direction of the core and distributed over the length of the core are disposed on the core, wherein the stator comprises an outlet channel disposed offset in the circumferential direction of the core with respect to the inlet channel. The inlet channel is connected to the outlet channel by the cooling channels, such that air from the inlet channel flows through the cooling channels into the outlet channel.

5 Claims, 2 Drawing Sheets

(51) Int. Cl.
*F03D 9/00* (2006.01)
*H02K 5/20* (2006.01)
*H02K 7/18* (2006.01)
*H02K 1/20* (2006.01)

(56) References Cited

U.S. PATENT DOCUMENTS

| | | | | |
|---|---|---|---|---|
| 5,698,925 | A * | 12/1997 | Coupart | 310/216.136 |
| 2006/0043801 | A1* | 3/2006 | Adra | 310/54 |
| 2007/0186692 | A1 | 8/2007 | Waszak et al. | |
| 2008/0179973 | A1 | 7/2008 | Kreitzer et al. | |
| 2008/0303360 | A1* | 12/2008 | Vinson et al. | 310/59 |
| 2010/0102655 | A1* | 4/2010 | Eriksen et al. | 310/63 |
| 2010/0237727 | A1* | 9/2010 | Mantere | 310/64 |
| 2010/0239441 | A1 | 9/2010 | Bade et al. | |
| 2012/0080983 | A1* | 4/2012 | Iund | 310/60 A |

FOREIGN PATENT DOCUMENTS

| | | | | |
|---|---|---|---|---|
| DE | 199 43 444 | A1 | 3/2001 | |
| DE | 19943444 | A1 * | 3/2001 | H02K 9/00 |
| DE | 103 07 813 | A1 | 9/2004 | |
| EP | 0 623 988 | A2 | 11/1994 | |

* cited by examiner

GENERATOR

CROSS-REFERENCES TO RELATED APPLICATIONS

This application is the U.S. National Stage of International Application No. PCT/EP2010/065607, filed Oct. 18, 2010, which designated the United States and has been published as International Publication No. WO 2011/048038 and which claims the priority of German Patent Application, Serial No. 10 2009 045 902.2, filed Oct. 18, 2010, pursuant to 35 U.S.C. 119(a)-(d).

BACKGROUND OF THE INVENTION

The invention relates to a generator.

The cooling of a stator of a generator, in particular a stator of a wind power generator, is based for commercially available generators on closed cooling circuits with additional heat exchangers (e.g. air-air or air-water coolers).

However, closed cooling circuits are technically demanding and require an additional cooling medium, such as for example water. Furthermore, as already mentioned closed cooling circuits for generators require heat exchangers.

SUMMARY OF THE INVENTION

The object of the invention is to devise a generator for which the cooling of the generator's stator requires no additional coolant, such as for example water.

This object is achieved by a generator, wherein the generator has a statically arranged stator and a rotor arranged so that it can rotate about an axis of rotation, wherein the stator has a yoke and a fan which sucks in air from the air surrounding the generator, wherein the stator has an entry duct into which the fan blows the air, wherein the entry duct is arranged in such a way that, at the yoke, it distributes the air sucked in by the fan over the length of the yoke, in the direction of the axis of rotation, wherein cooling channels which run in the circumferential direction on the yoke are arranged so they are distributed over the length of the yoke, wherein the stator has an exit duct which is arranged with an offset, in the circumferential direction around the yoke, relative to the entry duct, wherein the entry duct is linked via the cooling channels with the exit duct in such a way that the air from the entry duct flows through the cooling channels into the exit duct, wherein the generator is constructed in such a way that the air flowing through the exit duct is discharged into the air surrounding the generator.

Particularly efficient cooling of the stator is achieved by the feeding of the cooling air, running in accordance with the invention in the circumferential direction around the yoke.

Advantageous embodiments of the invention are revealed by the dependent claims.

It proves to be advantageous if the generator is designed in such a way that the air from the exit duct is discharged into the air surrounding the generator in the direction of the generator's axis of rotation, because it is possible thereby to reliably prevent the warm discharged air from being prematurely sucked in again as air for cooling purposes.

It proves further to be advantageous if the yoke has grooves running in the circumferential direction of the yoke, and the cooling channels are formed by the grooves. By this means, it is possible to achieve not only particularly good cooling of the yoke but also a particularly simple mechanical construction of the stator.

The generator can here be designed, for example as a wind power generator.

BRIEF DESCRIPTION OF THE DRAWING

An exemplary embodiment of the invention is shown in the drawing and is explained in more detail below. Shown here are.

DETAILED DESCRIPTION OF PREFERRED EMBODIMENTS

Figure 1:
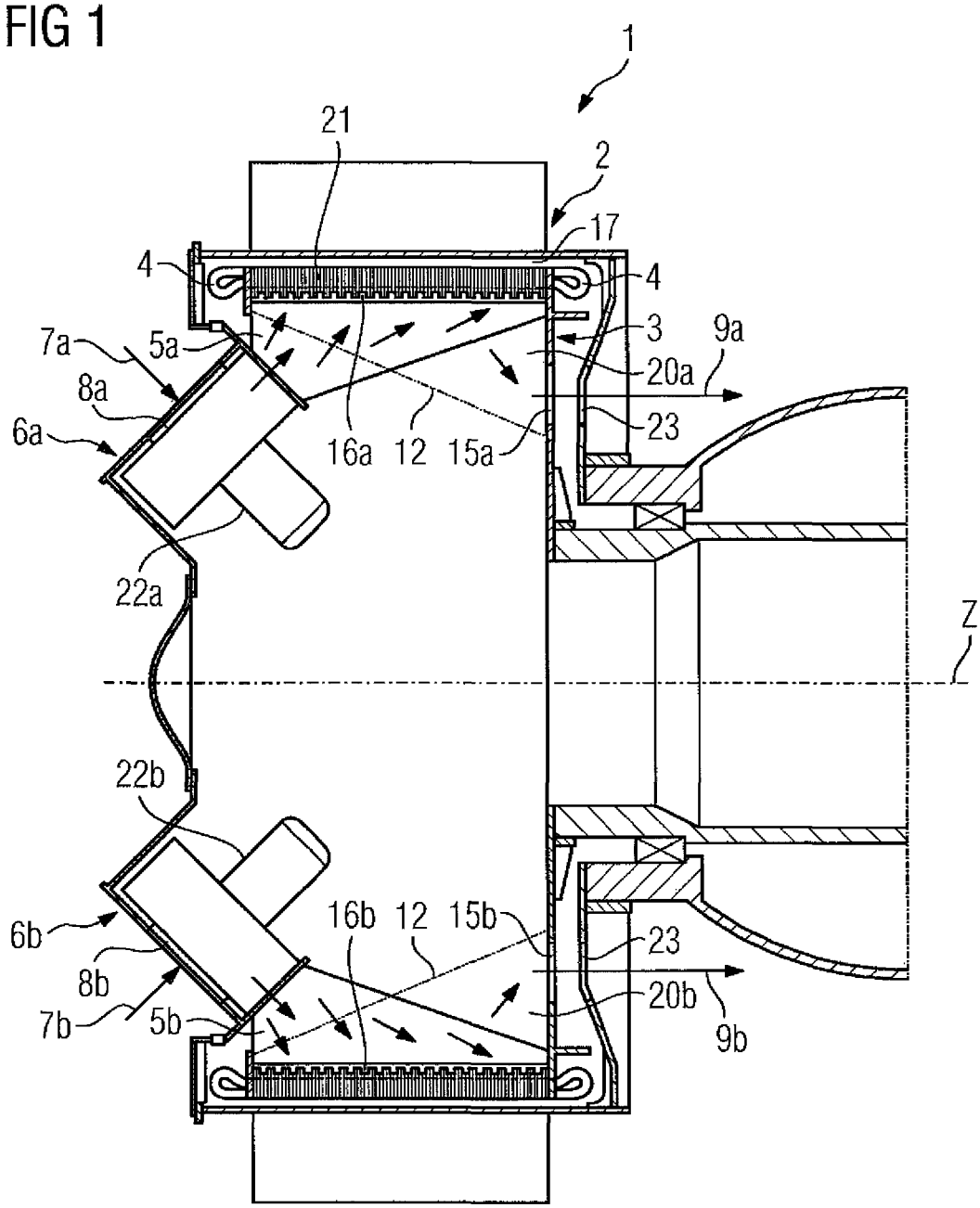
FIG. 1 a schematic view of a section along the axis of rotation of a generator in accordance with the invention, FIG. 2 a schematic view of a section through a generator in accordance with the invention, perpendicular to the axis of rotation, and FIG. 3 a detailed view of FIG. 1.
Figure 2:
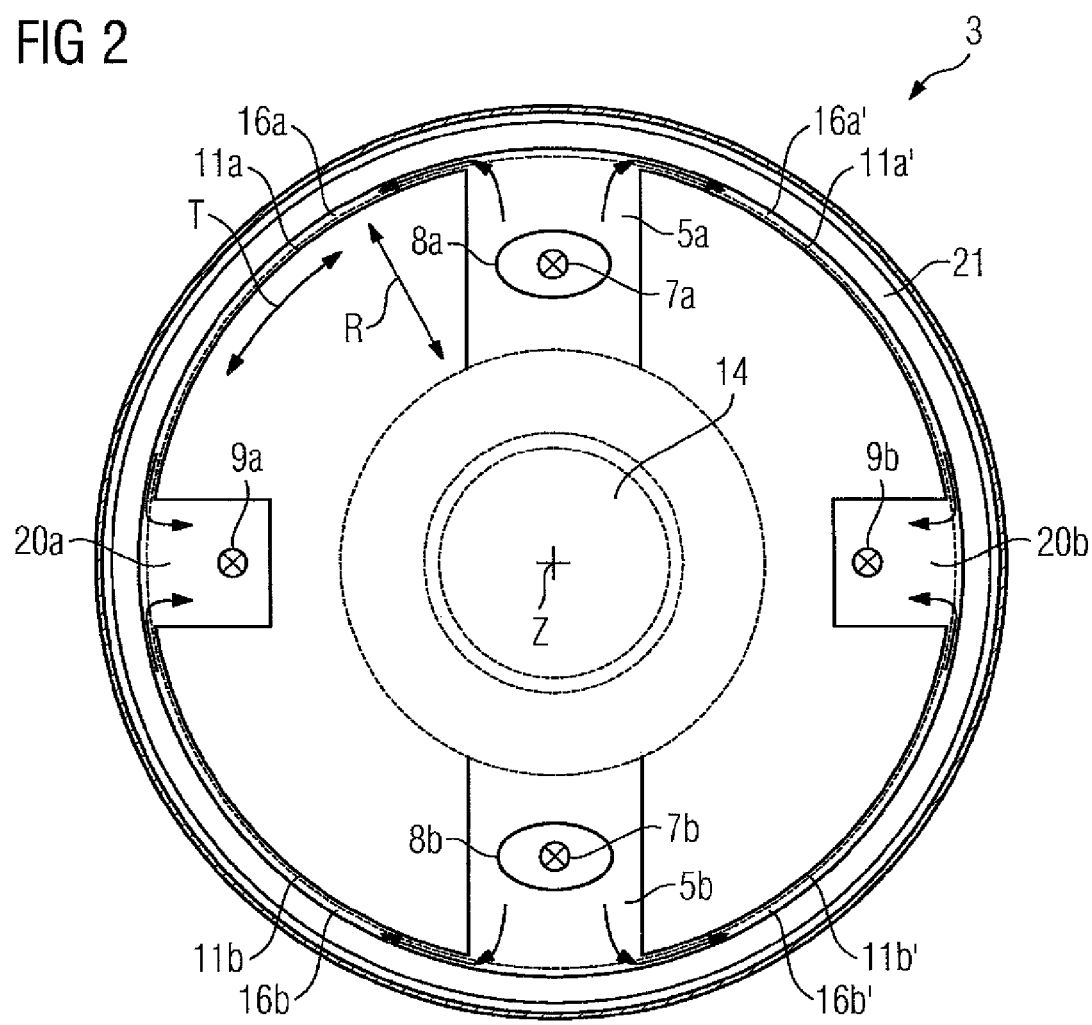
Figure 3:
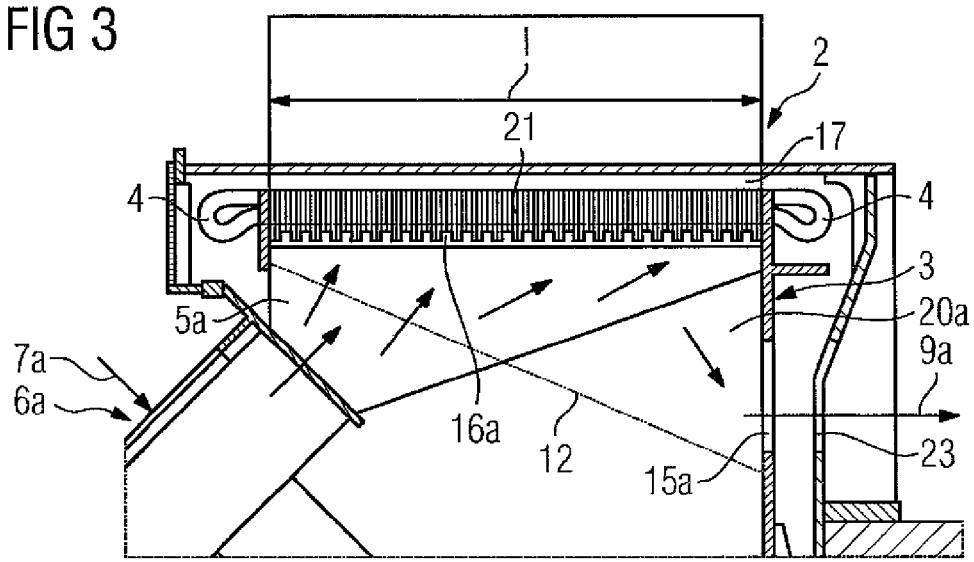

An exemplary embodiment of the invention is described below with reference to FIG. 1, FIG. 2 and FIG. 3. Here, elements which are the same in the three figures have been given the same reference marks. FIG. 3 shows a detailed section of FIG. 1, in which the important elements of the invention are shown enlarged. FIG. 1 shows, as already mentioned, a view of a section through the generator along the axis of rotation Z, and in particular through the stator of the generator. FIG. 2 shows the section perpendicular to the axis of rotation Z corresponding to FIG. 1, wherein in FIG. 2, for the sake of clarity, some elements of the rotor are not shown. For the sake of clarity, all three figures show only the elements of the generator 1 which are important for an understanding of the invention.

The generator 1 in accordance with the invention, which in the case of the exemplary embodiment is in the form of a wind power generator, has a stator 3 which in relation to the generator's installation site has a static arrangement, and a rotor 2 arranged so that it can rotate about an axis of rotation Z of the generator. In FIG. 1, for the sake of clarity and because they are unimportant for an understanding of the invention, some elements of the rotor 2 are shown only in starkly schematic form, as two rectangles. Here, in the context of the exemplary embodiment the rotor 2 has permanent magnets, which are not shown for the sake of clarity, to create a magnetic field. The rotor 2 incorporates those elements of the generator 1 which, when the generator 1 is in operation, rotate about the axis of rotation Z. When the generator 1 is operating, the rotor 2 rotates about the axis of rotation Z. Arranged between the rotor 2 and the stator 3 is an air gap 17. Because, when the generator 1 is operating, the rotor 2 rotates about the stator 3 which is arranged in the center of the generator 1, in the context of the exemplary embodiment the generator 1 is realized as a so-called external rotor machine.

An important element of the stator 3 in this case is a yoke 21. In the context of the exemplary embodiment, the yoke 21 here consists of lamina, arranged one behind another in the direction of the axis of rotation Z, which taken together form a so-called core stack. In this case, the individual lamina are generally provided with an electrically insulating layer, e.g. a layer of lacquer. The lamina have recesses running through them in the direction of the axis of rotation Z, in which are arranged the electrical windings of the stator. In this connection, FIG. 1 shows the ends 4 of a winding, which at their longitudinal ends emerge from the lamina. In the context of the invention, the yoke 21 consists of a core stack. However, it is also possible that the yoke 21, instead of being made up of individual lamina, is of solid construction and consists of a solid material, such as for example one or more solid iron workpieces.

Further, in the context of the exemplary embodiment the stator 3 has two fans 6a and 6b, which have separate electrical drives 22a and 22b. Because these fans 6a and 6b are not dependent on the rotation of the rotor 2, but each has a separate electrical drive (electric motor) assigned to it, such fans are also referred to technically as separately driven fans.

The fans 6a and 6b have air intake openings 8a and 8b. When the fans are operating, the two fans 6a and 6b suck in air from the air surrounding the generator 1, this being shown by the two arrows 7a and 7b in the figures. It is noted at this point that the arrows shown in FIGS. 1, 2 and 3 represent the direction of flow of the air which is used to cool the stator.

Further, the stator 3 has two entry ducts 5a and 5b which run in the direction of the axis of rotation Z, into which the fans 6a and 6b blow the air which is sucked in from the surrounding air, wherein the fan 6a blows the air into the entry duct 5a and the fan 6b blows the air into the entry duct 5b. Here, the entry ducts 5a and 5b are arranged such that, at the yoke 21 of the stator 3, they distribute the air sucked in by the fans over the length l, in the direction of the axis of rotation Z, of the yoke 3 at a place on the yoke 3 which is associated with the entry duct concerned.

In order to realize good cooling of the stator, arranged on the yoke are cooling channels which, in relation to the axis of rotation Z, run along the yoke 21 in the circumferential direction T of the yoke 21, and which are distributed over the length l of the yoke 21, wherein for the sake of clarity in FIG. 1 only two cooling channels 16a and 16b have been given reference marks, and in FIG. 3 only one cooling channel 16a has been given a reference mark. FIG. 2 shows the cooling channels 16a, 16a', 16b and 16b'. In order to prevent the escape of air out of the cooling channels in the radial direction R towards the axis of rotation Z, the stator 3 has plates 11, 11a, 11a', 11b and 11b' which are curved in an arc-shape.

Further, the stator 3 has, in the context of the exemplary embodiment, two exit ducts 20a and 20b which, relative to the entry ducts 5a and 5b, are arranged with an offset in the circumferential direction T of the yoke 21. In the context of the exemplary embodiment, the exit ducts are here arranged with an offset of 90° in the circumferential direction T relative to the axis of rotation Z of the yoke 21, as can easily be seen in FIG. 2. The offset does not absolutely have to be 90°, but an angle of 90° in the arrangement as per the exemplary embodiment does however ensure that the stator 3 is cooled and in particular the yoke 21 is cooled over the entire extent of the stator 3.

In relation to FIG. 1, it should be remarked that the contour of the two exit ducts 20a and 20b, with the reference mark 12, as shown is offset by 90° relative to the axis of rotation compared to the reality, to enable the entry ducts 5a and 5b to be shown in FIG. 1 together with the exit ducts 20a and 20b, within the drawing plane shown in FIG. 1.

As can be seen from FIGS. 1 and 3, the entry ducts 5a and 5b are located on one side of the yoke 21 and the exit ducts 20a and 20b are located on the other opposite side of the yoke 21 as considered in direction of the axis of rotation Z. The entry ducts 5a and 5b have walls 5a' and 5b' which are located radially inside the yoke 21 substantially between its opposite sides and are inclined towards the cooling channels 16a and 16b, and the exit ducts 20a and 20b have walls 20a' and 20b' which are also located radially inside the yoke 21 substantially between its opposite sides and are inclined towards the cooling channels 16a and 16b, in opposite direction to the walls 5a' and 5b'.

As shown in FIG. 2, the entry duct 5a is connected via the cooling channels 16 and 16a', and the entry duct 5b via the cooling channels 16b and 16b', to the exit ducts 20a and 20b in such a way that the air from the entry duct 5a flows through the cooling channels 16a and 16a' and the air from the entry duct 5b through the cooling channels 16b and 16b' into the exit ducts 20a and 20b, this being shown by the appropriate arrows in FIG. 1, FIG. 2 and FIG. 3. The air then flows through openings 15a and 15b in the stator 3 arranged in the region of the exit ducts 20a and 20b and, through air discharge openings 23 distributed over the perimeter of the rotor 2, out of the generator 1 into the surrounding air. Here, the air is discharged from the exit ducts 20a and 20b into the air surrounding the generator 1, in the direction of the axis of rotation Z of the generator 1. Here, relative to the air intake openings 8a and 8b, the air discharge openings 23 are arranged at the opposite end of the generator 1 in the direction of the axis of rotation Z. The arrows 9a and 9b in the figures show the air emerging from the two exit ducts 20a and 20b.

In the context of the exemplary embodiment, the cooling channels are realized in the form of grooves. Thus the yoke 21 has such grooves, running in the circumferential direction of the yoke 21 relative to the direction of the axis of rotation Z, wherein for the sake of clarity only one groove 16a is shown in FIG. 3. In this case the grooves can, for example, be realized by an appropriate design and arrangement, one behind another, of the lamina of the yoke during the manufacture of the core stack or, for example, can be milled out in the finished core stack by an appropriate milling machine. If the yoke is of solid construction, and consists of a solid material such as for example of one or more solid iron workpieces, the grooves can accordingly be milled in by means of a milling machine. Alternatively however, the cooling channels can also be realized using piping for example, in particular pipes which have a square or rectangular cross section and on the yoke run in the circumferential direction T of the yoke 21 and have a heat-conducting contact with the yoke.

In the case of the exemplary embodiment shown, the generator has two fans and correspondingly two entry and two exit ducts. But of course, the generator can also have just a single fan and a single entry duct and a single exit duct, or however can also have more than two fans, and also more than two entry ducts and also more than two exit ducts.

The inventive generator is used for the generation of electrical power.

The invention claimed is:
1. A generator, comprising:
a rotor arranged for rotation about an axis of rotation;
a statically arranged stator and including a yoke which has cooling channels distributed over a length of the yoke and extending in a circumferential direction of the yoke, and a fan which draws air from air surrounding the generator for blowing into an entry duct which is arranged to distribute the air over a length of the yoke in a direction of the axis of rotation, said stator having an exit duct is arranged with an offset in the circumferential direction around the yoke relative to the entry duct, said entry duct being linked via the cooling channels with the exit duct to enable air from the entry duct to flow through the cooling channels into the exit duct for subsequent discharge into air surrounding the generator,
wherein the yoke has two opposite sides which are spaced from one another in the direction of the axis of rotation,
wherein the entry duct is located on one of the two opposite sides of the yoke and the exit duct is located on the other of the two opposite sides of the yoke;

wherein the entry duct and the exit duct each have a wall which is located radially inside the yoke substantially between its opposite sides and is inclined towards the cooling channels;
wherein the generator is constructed in the form of an external rotor machine.

2. The generator of claim 1, wherein the exit duct is configured for discharge of air into air surrounding the generator in a direction of the axis of rotation.

3. The generator of claim 1, wherein the yoke has grooves running in the circumferential direction of the yoke to form the cooling channels.

4. The generator of claim 1, constructed in the form of a wind power generator.

5. The generator of claim 1, wherein the inclined wall of the entry duct and the inclined wall of the exit duct are inclined in opposite directions relative to each other.

* * * * *